(12) United States Patent
Scott

(10) Patent No.: US 11,110,748 B1
(45) Date of Patent: Sep. 7, 2021

(54) ILLUMINATED VEHICLE DISTRESS SIGN

(71) Applicant: Charles Scott, Saxe, VA (US)

(72) Inventor: Charles Scott, Saxe, VA (US)

( * ) Notice: Subject to any disclaimer, the term of this patent is extended or adjusted under 35 U.S.C. 154(b) by 0 days.

(21) Appl. No.: 16/716,621

(22) Filed: Dec. 17, 2019

(51) Int. Cl.
| | |
|---|---|
| *B60Q 7/00* | (2006.01) |
| *B60C 7/00* | (2006.01) |
| *G09F 13/22* | (2006.01) |
| *G09F 9/302* | (2006.01) |
| *G09F 21/04* | (2006.01) |
| *G09F 7/20* | (2006.01) |
| *G09F 7/18* | (2006.01) |

(52) U.S. Cl.
CPC ............... *B60C 7/00* (2013.01); *G09F 7/20* (2013.01); *G09F 9/302* (2013.01); *G09F 13/22* (2013.01); *G09F 21/04* (2013.01); *G09F 2007/1865* (2013.01)

(58) Field of Classification Search
CPC .............................. G09F 2013/044; B60Q 7/00
USPC .......................................................... 40/593
See application file for complete search history.

(56) References Cited

U.S. PATENT DOCUMENTS

| | | | | |
|---|---|---|---|---|
| 3,738,039 | A | | 6/1973 | De Furia |
| 3,762,360 | A | * | 10/1973 | Hawes .................. B60Q 7/005 |
| | | | | 116/28 R |
| 3,903,629 | A | | 9/1975 | Gruna |
| 4,430,638 | A | * | 2/1984 | Parker ..................... B60Q 7/00 |
| | | | | 116/63 P |
| D295,640 | S | * | 5/1988 | Breault ..................... D10/109.1 |
| 4,827,646 | A | * | 5/1989 | Miller ...................... B60Q 1/50 |
| | | | | 116/40 |
| 5,023,607 | A | * | 6/1991 | Staten .................... G08B 5/006 |
| | | | | 340/908.1 |
| 5,126,926 | A | * | 6/1992 | Chiang Wen ............ B60Q 7/00 |
| | | | | 340/472 |
| 9,721,487 | B1 | * | 8/2017 | Jeansonne ............... G09F 21/04 |
| 9,799,241 | B2 | * | 10/2017 | Stockton ................ B60Q 1/268 |
| 9,928,764 | B2 | * | 3/2018 | Heath ..................... B60Q 1/268 |
| 2002/0067290 | A1 | * | 6/2002 | Peet, II .................... E01F 9/615 |
| | | | | 340/907 |
| 2004/0098894 | A1 | * | 5/2004 | Thomas .................. G09F 21/02 |
| | | | | 40/586 |
| 2011/0141735 | A1 | * | 6/2011 | Jablonski ................. B60Q 7/00 |
| | | | | 362/235 |
| 2016/0039364 | A1 | * | 2/2016 | Findlay ................... G01S 19/14 |
| | | | | 340/468 |

* cited by examiner

*Primary Examiner* — Kristina N Junge
(74) *Attorney, Agent, or Firm* — Sanchelima & Associates PA; Christian Sanchelima; Jesus Sanchelima

(57) ABSTRACT

An illuminated vehicle distress sign is disclosed herein. The illuminated vehicle distress sign includes an emergency signal device comprising a vehicle window attachment. The vehicle window attachment has a first shaft hingedly attached thereto and a second shaft hingedly attached to the first shaft which supports a rigid signaling placard at the distal end thereof. Additionally, the signaling placard includes a plurality of battery powered and multi-colored LED's disposed on the peripheral edges of the front and back faces thereof. Furthermore, the signaling placard may be provided in the form of a square or in the shape of a hand. Additionally, the LEDs disposed on the placard may be mounted in a configuration to form the word "HELP". Other configurations and other sizes may be used.

9 Claims, 4 Drawing Sheets

ILLUMINATED VEHICLE DISTRESS SIGN

BACKGROUND OF THE INVENTION

1. Field of the Invention

The present invention relates to a vehicle distress sign and, more particularly, to a vehicle distress sign that is powered by a vehicle and allows a user to grab the attention of incoming traffic for help and support.

2. Description of the Related Art

Several designs for a vehicle distress sign have been designed in the past. None of them, however, include an emergency signal device comprising a vehicle window attachment having a first shaft hingedly attached thereto and a second shaft hingedly attached to the first shaft which supports a rigid signaling placard at the distal end thereof. Additionally, the signaling placard includes a plurality of battery powered and multi-colored LED's disposed on the peripheral edges of the front and back faces thereof. Furthermore, the signaling placard may be provided in the form of a square or in the shape of a hand. Additionally, the LEDs disposed on the placard may be mounted in a configuration to form the word "HELP". Other configurations and other sizes may be used.

Applicant believes that a related reference corresponds to U.S. Pat. No. 3,738,039 issued for a highway safety aid for automobiles, boats, trailers and the like, having an arm and hook for fitting securely over the upper edge of a glass window or the like. Applicant believes that another reference corresponds to U.S. Pat. No. 3,903,629 issued for an emergency sign, to be suspended in a window or at the back of an automotive vehicle. However, the references differ from the present invention because they fail to include the distinct elements of the present invention such as an emergency signal device comprising a vehicle window attachment having a first shaft hingedly attached thereto and a second shaft hingedly attached to the first shaft which supports a rigid signaling placard at the distal end thereof. Additionally, the signaling placard includes a plurality of battery powered and multi-colored LED's disposed on the peripheral edges of the front and back faces thereof.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an illuminated vehicle distress sign that provides an effective way for a disabled vehicle to alert other motorists of a roadside emergency.

It is another object of this invention to provide an illuminated vehicle distress sign that increases visibility, safety, and communication.

It is still another object of the present invention to provide an illuminated vehicle distress sign that could help to prevent further accidents and delays.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
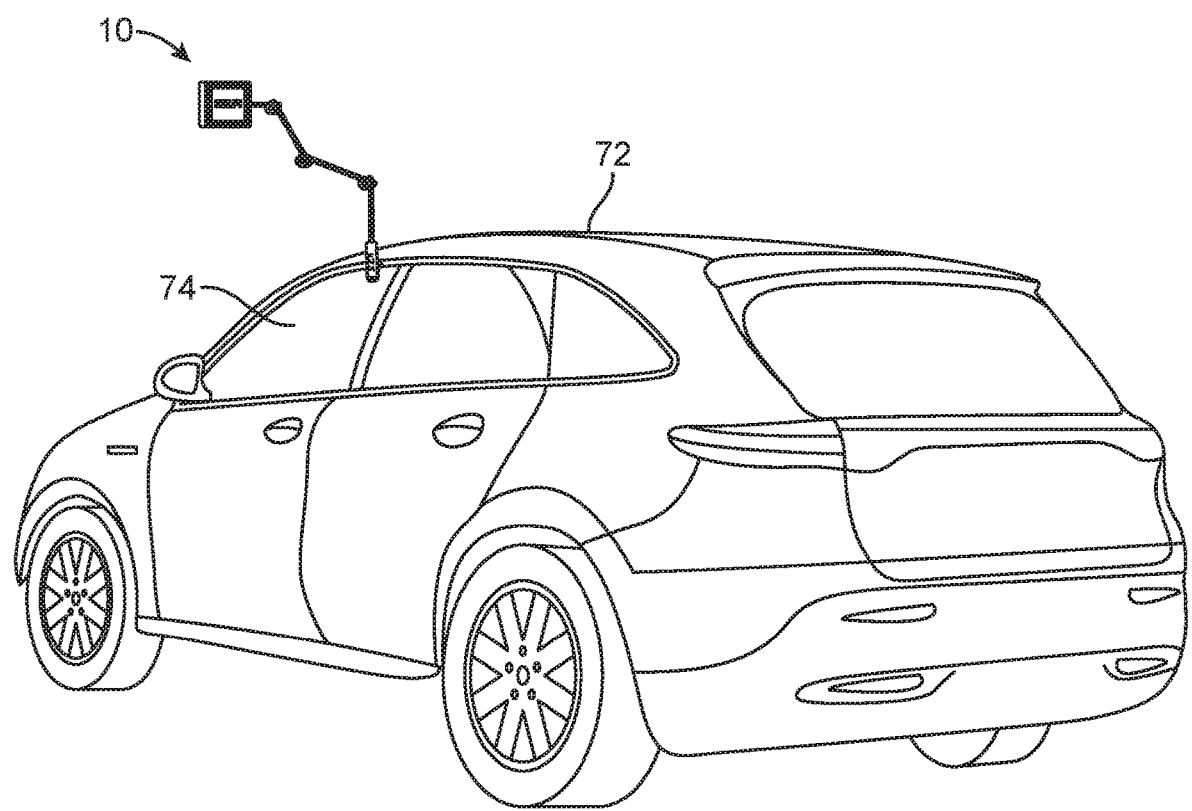
FIG. 1 represents a view of illuminated vehicle distress sign 10 in its operational environment in accordance to an embodiment of the present invention.
Figure 2:
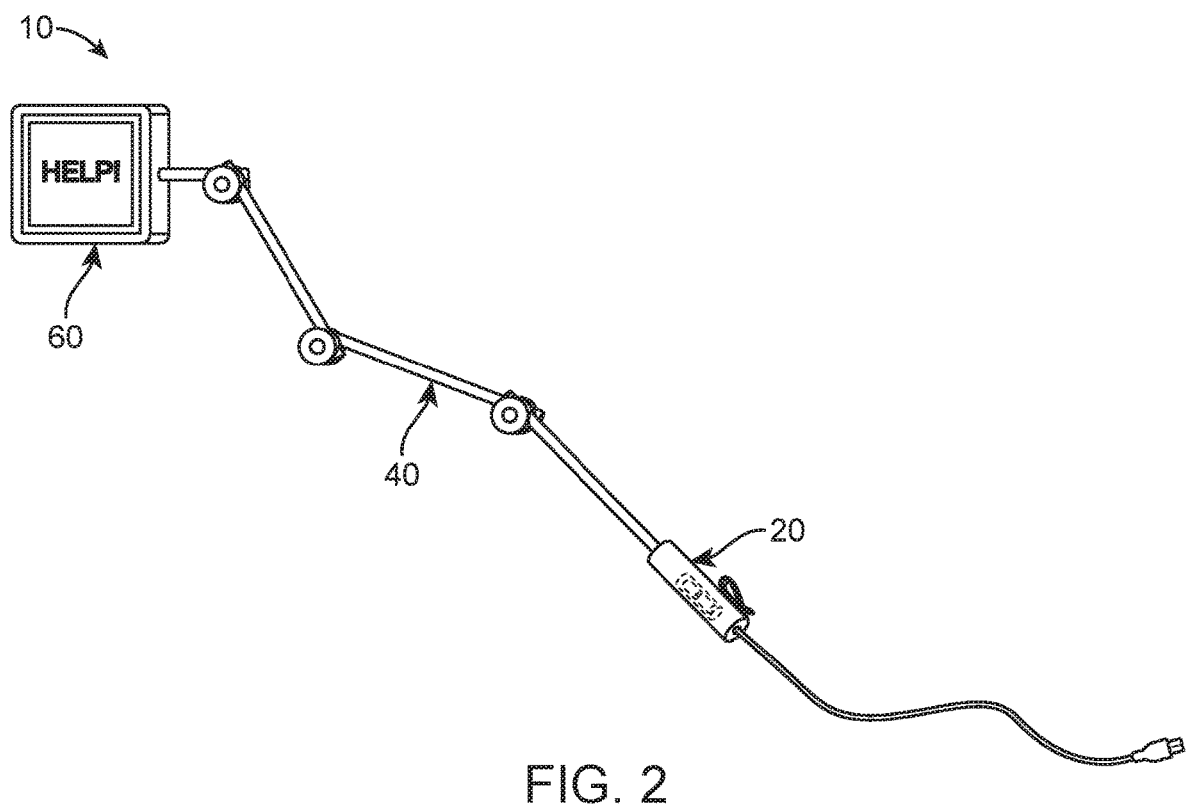
FIG. 2 shows an isometric view of illuminated vehicle distress sign 10 in accordance to an embodiment of the present invention.
Figure 3:
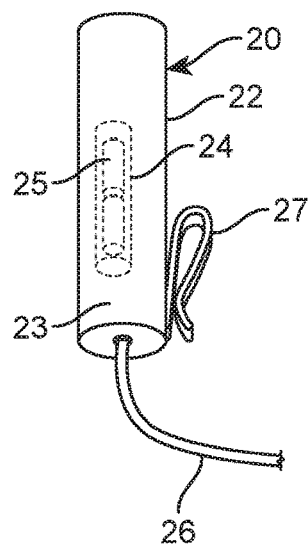
FIG. 3 illustrates an isometric view of handle assembly 20 in accordance with an embodiment of the present of invention.
Figure 4:
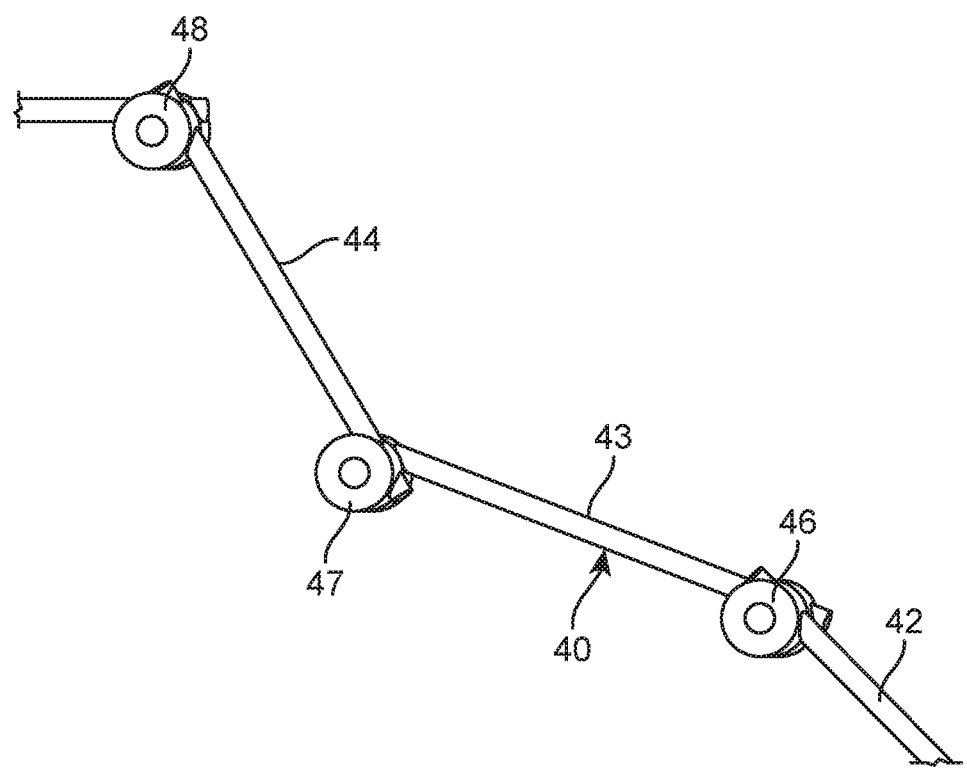
FIG. 4 is a representation of shaft assembly 40 in accordance to an embodiment of the present invention.
Figure 5:
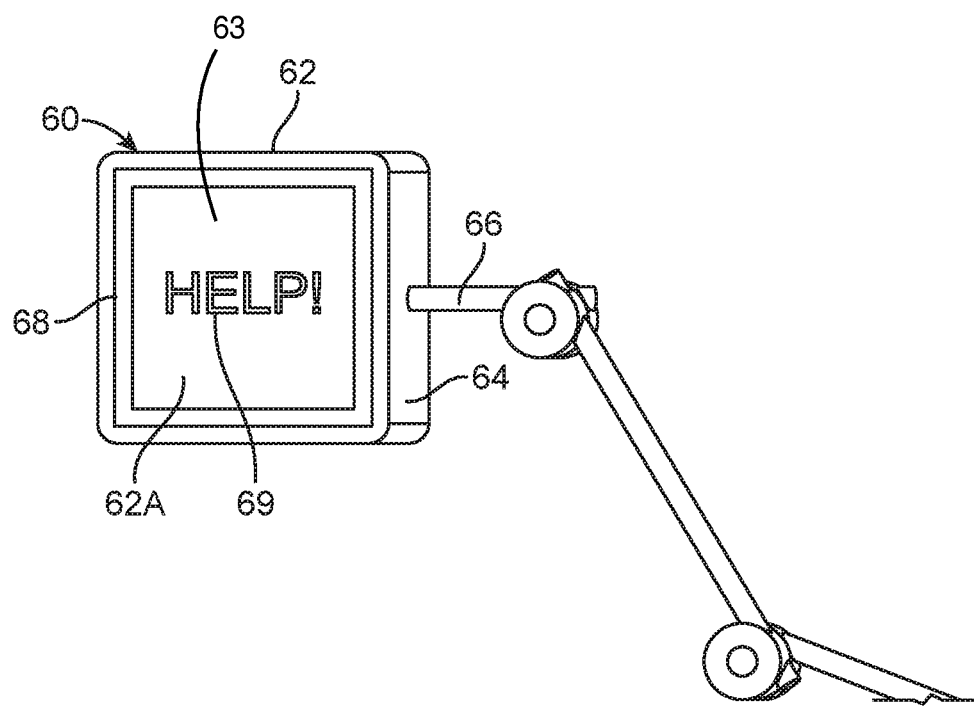
FIG. 5 shows an isometric view of placard assembly 60 in accordance to an embodiment of the present invention.
Figure 6:
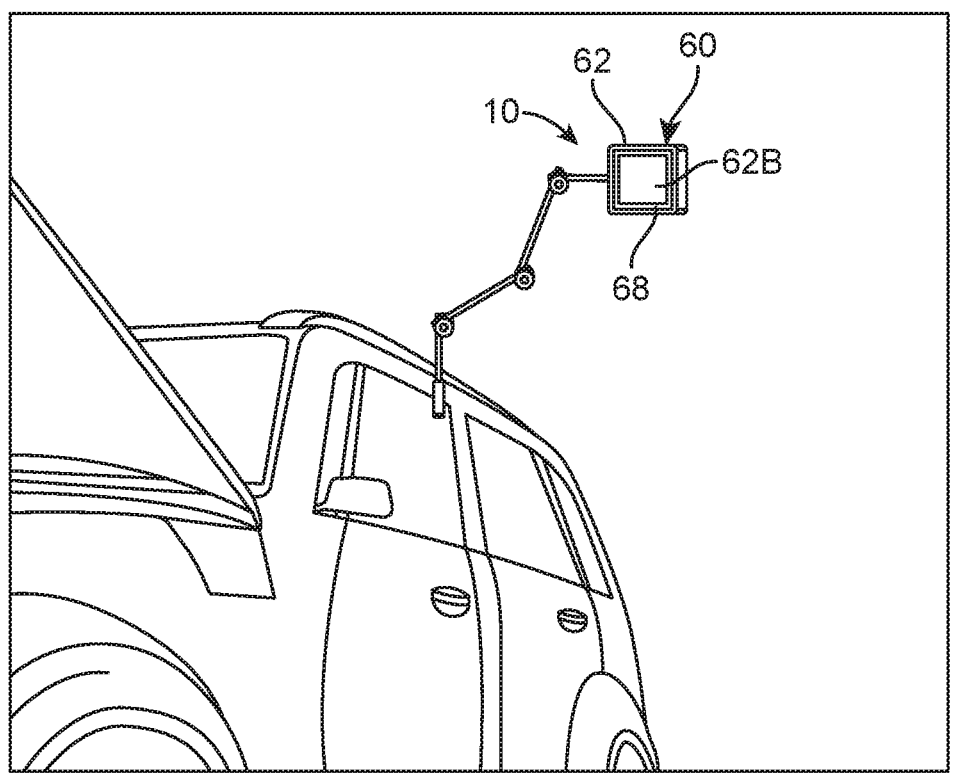
FIG. 6 illustrates a rear view of placard assembly 60 in accordance to an embodiment of the present invention.

Referring now to the drawings, where the present invention is generally referred to with numeral 10, it can be observed an illuminated vehicle distress sign 10 that includes a handle assembly 20, a shaft assembly 40, a placard assembly 60, and a vehicle 72.

Handle assembly 20 includes a body 22 which may be cylindrical in shape and having an outer surface area 23. In one embodiment, body 22 may be of suitable dimensions to fit comfortable in a user's hand. Additionally, body 22 may be made of suitable materials such but not limited to plastic, metal, and the like. Furthermore, body 22 allows a user to comfortably hold and maneuver illuminated vehicle distress sign 10. It should be understood that additional embodiments may include body 22 having other additional shapes. In one embodiment, body 22 may include a compartment 24. Compartment 24 is a housing within body 22 configured to store batteries 25 therein. Batteries 25 may be two AA batteries in one configuration. In one embodiment, compartment 24 may be mounted along outer surface area 23 of body 22. Furthermore, batteries 25 provide suitable power to placard assembly 60 to provide the proper illumination needed. It should be understood that any suitable batteries 25 may be used and housed within compartment 24. Additionally, handle assembly 20 may further include a power cable 26 mounted integrally to a bottom end of body 22. In one embodiment, power cable 26 is a USB connecting cable. Power cable 26 may be configured to connect to a USB outlet of vehicle 72. It should be understood that other suitable cable for providing power may be used for power cable 26. This may include other forms of USB cables as well as additional power cables configured to be attached to a cigarette lighter of vehicle 72. Handle assembly 20 further includes a window mount 27 located near a bottom end of outer surface area 23 of body 22. In one embodiment, window mount 27 is a hook shaped member configured to be attached to a window 74 of vehicle 72. In one embodiment, window mount 27 is received by an upper edge of window 74 of vehicle 72. Window mount 27 provides a secure attaching means for handle assembly 20 thereon vehicle 72. It should be understood that handle assembly 20 may be used by being held in a user's hand or by being mounted on window 74 of vehicle 72.

Shaft assembly 40 includes a first shaft 42, a second shaft 43, and a third shaft 44. In one embodiment, all of the shafts may be cylindrical in shape and made of a suitable materiel. Such a material may include but is not limited to plastic, metal, carbon fiber and the like. Furthermore, first shaft 42, second shaft 43, and third shaft 44 may all have the same dimensions each having the same size and length. It should be understood that other embodiments of illuminated distress sign 10 may include embodiments including different shafts of different lengths. In one embodiment, first shaft 42 is integrally mounted to a top end of handle assembly. First shaft 42 may be mounted to handle assembly 20 using known means in the art such as but not limited to welding, fasteners, adhesives and the like. Furthermore, a top most end of first shaft 42 includes a first pivot member 46. In one embodiment, first pivot member 46 may be a cylindrical member used to integrally attach first shaft 42 and second shaft 43. First pivot member 46 allows a user to adjust the angle to second shaft 43 that is mounted thereon first shaft 42. In one embodiment, second shaft 43 further includes a second pivot member 47 mounted on a top most end of second shaft 43. Second pivot member 47 may be used to integrally mount third shaft 44 thereon second shaft 43. Furthermore, a third pivot member 48 may be additionally mounted to a top most end of third shaft 44. In one embodiment, third pivot member 48 is then mounted thereon placard assembly 60. It should be understood that additional embodiments may include additional or less shafts than the ones previously described. Furthermore, any number of pivot members may be used for illuminated distress sign 10. Shaft assembly 40 allows a user to adjust the angles of the shafts included in shaft assembly 40. A user may then find a the most suitable and optimal angle to set up illuminated distress sign 10.

Placard assembly 60 including a placard 62 including a front end 62A and a back end 62B having the shape of a rectangular prism. Placard 62 further includes a sidewall 64 including a connecting rod 66 protruding thereout. In one embodiment connecting rod 66 may be cylindrical in shape and connected to third pivot member 48. Connecting rod 66 may be integrally mounted to third pivot member 48. In one embodiment, connecting rod 66 may have a length that is less than the lengths of the shafts provided by shaft assembly 60. Additionally, front end 62A and back end 62B may further include a plurality of LEDs 68 thereon. In one embodiment, plurality of LEDs are mounted around peripheral edges of front end 62A and back end 62B. Furthermore, front end 62A may include a central area having plurality of LEDs 68 thereon. Additionally, plurality of LEDs 68 of the central area may be positioned in a way to form indicia 69 thereon. In one embodiment, indicia 69 may read as the word "HELP!". In another embodiment, indicia 69 may read as the abbreviation "SOS". Additionally, plurality of LEDs 68 may be powered by batteries 25 or power cable 26. It should be understood that additional embodiments of placard assembly 60 may include additional placards having other additional shapes. Placard assembly 60 may further include a tracking device 63 provided as hardware within placard 62. Additionally, tracking device 63 may be configured to transmit a user's location to services or individuals that may be able to provide assistance to a user in distress. This may include individuals such as family members, towing companies, and roadside assistance services. In a situation where a user's vehicle 72 breaks down, tracking device 63 may then transmit the location of vehicle 72 to a roadside assistance service. This provides the roadside assistance service with the location of the user in distress and are then able to provide assistance to the user.

Figure 7:
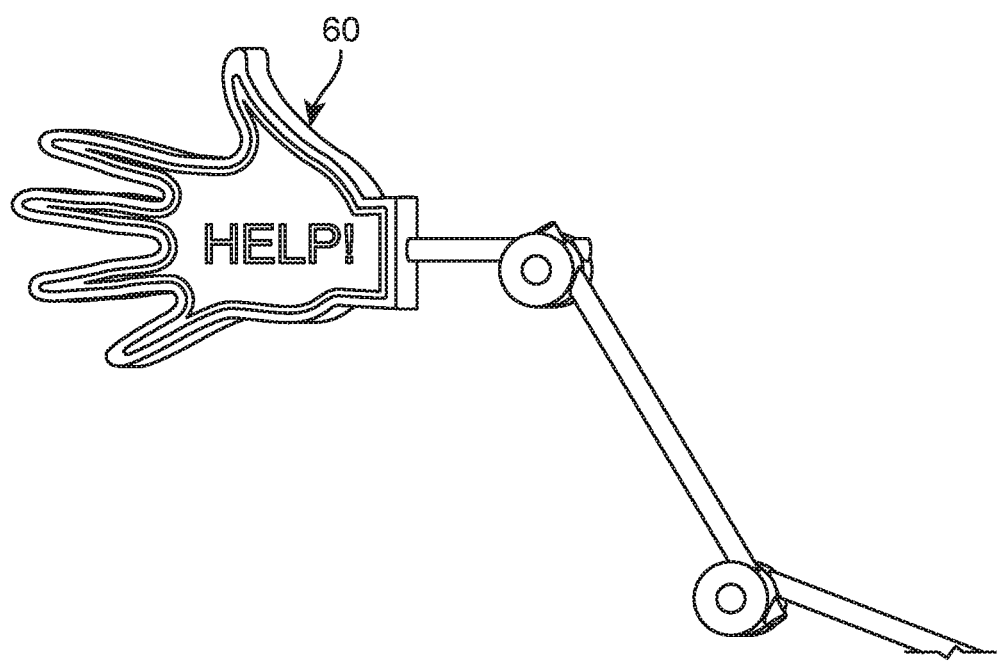
FIG. 7 represents another isometric view of placard assembly 60 in accordance to another embodiment of the present invention.

As seen in FIG. 7, an additional embodiment of placard assembly 60 may be observed. In this embodiment, placard 62 may be in the shape of a human hand. This embodiment of placard assembly 60 includes all of the other additional elements previously described of placard assembly 60. It should be understood that any suitable shape may be included for placard assembly 60. A user may then use illuminated distress sign 10 in the event of a vehicle emergency. During this event a user may hold illuminated distress sign 10 in their hand on the side of the road in order to signal for help for on coining traffic. Additionally, a user may mount illuminated distress sign 10 to a vehicle in order to signal for help. Illuminated distress sign 10 provides a user with an optimal system for signaling help on a road in the event of a vehicle emergency.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for an illuminated vehicle distress sign, comprising:
   a. a vehicle having a window;
   b. a handle assembly, including a body being cylindrical in shape and having an outer surface area, wherein said handle assembly includes a compartment to house batteries therein, wherein said handle assembly further includes a power cable located on a bottom end of said handle assembly, wherein said handle assembly includes a window mount located on a bottom end of said outer surface area of said body, said window mount being a hook shaped member with a first end and a second end, wherein said first end is abuttingly engaged with said outer surface of said body, wherein said hook shaped member has a curved shape wherein the second end is layered and abutting with the first end to form said hook shaped member, wherein said hook shaped member receives an upper top edge of a window for a vehicle, said window being in a rolled up position to engage the hook shaped member with the vehicle and the window;
   c. a shaft assembly, including a first shaft integrally mounted to a top end of said handle assembly, wherein said first shaft is cylindrical in shape, wherein said first shaft further includes a first pivot member mounted on a top most end of said first shaft, wherein said shaft assembly further includes a second shaft mounted to said first pivot member, said second shaft extending through said first pivot member and partially protruding therefrom, said second shaft being cylindrical in shape, wherein said second shaft further includes a second pivot member mounted on a top most end of said second shaft, wherein said shaft assembly further includes a third shaft mounted to said second pivot member, said third shaft extending through said second pivot member and partially protruding therefrom, said third shaft being cylindrical in shape, wherein said third shaft further includes a third pivot member mounted to a top most end of said third shaft, wherein said first shaft, said second shaft, and said third shaft all have the same length, wherein said first pivot member, said second pivot member, and said third pivot member being configured to allow a user to adjust the angle of said first shaft, said second shaft, and said third shaft, wherein each of said first, second, and third pivot members each are circular pivot members; and d. a placard assembly, including a placard being the shape of a rectangular prism, wherein said placard includes a sidewall having a connecting rod protruding thereout, wherein said connecting rod is mounted to said third pivot point of said third shaft, wherein said placard includes a front end and a back end, wherein said front end and said back end includes a plurality of LEDs, wherein said plurality of LEDs are disposed on peripheral edges of said front end and said back end to define a rectangular perimeter, wherein said plurality of LEDs are disposed within a central area of said front end to form an indicia.

2. The system for an illuminated vehicle distress sign of claim 1 wherein said indicia is the word "HELP!".

3. The system for an illuminated vehicle distress sign of claim 1 wherein said indicia is the word "SOS".

4. The system for an illuminated vehicle distress sign of claim 1 wherein said connecting rod is cylindrical in shape and has a length less than that of said third shaft.

5. The system for an illuminated vehicle distress sign of claim 1 wherein said power cable is a USB connecting cable.

6. The system for an illuminated vehicle distress sign of claim 5 wherein said power cable to connects to a USB outlet of said vehicle.

7. The system for an illuminated vehicle distress sign of claim 1 wherein said placard assembly is illuminated in the event of a vehicle emergency.

8. The system for an illuminated vehicle distress sign of claim 1 wherein said placard assembly further includes a tracking device adapted to transmit a user's location to family members, towing companies, and roadside assistance.

9. A system for an illuminated vehicle distress sign, consisting of:

a. a vehicle having a window;

b. a handle assembly, including a body being cylindrical in shape and having an outer surface area, wherein said handle assembly includes a compartment to house batteries therein, wherein said handle assembly further includes a cable located on a bottom most end of said handle assembly, wherein said cable is a USB connecting cable, wherein said cable to connects to a USB outlet of said vehicle, wherein said handle assembly includes a window mount located on a bottom end of said sidewall of said body, said window mount being a hook shaped member with a first end and a second end, wherein said first end is abuttingly engaged with said outer surface of said body, wherein said hook shaped member has a curved shape wherein the second end is layered and abutting with the first end to form said hook shaped member, wherein said second end is curves outwardly after it engages with said first end, wherein said hook shaped member receives an upper top edge of the window for said vehicle, said window being in a rolled up position to engage the hook shaped member with the vehicle and the window;

c. a shaft assembly, including a first shaft integrally mounted to a top end of said handle assembly, wherein said first shaft is cylindrical in shape, wherein said first draft further includes a first pivot member mounted on a top most end of said first shaft, wherein said shaft assembly further includes a second shaft mounted to said first pivot member, said second shaft extending through said first pivot member and partially protruding therefrom, said second shaft being cylindrical in shape, wherein said second shaft further includes a second pivot member mounted on a top most end of said second shaft, wherein said shaft assembly further includes a third shaft mounted to said second pivot member, said third shaft extending through said second pivot member and partially protruding therefrom, said third shaft being cylindrical in shape, wherein said third shaft further includes a third pivot member mounted to a top most end of said third shaft, wherein said first shaft, said second shaft, and said third shaft all have the same length, wherein said first pivot member, said second pivot member, and said third pivot member being configured to allow a user to adjust the angle of said first shaft, said second shaft, and said third shaft; and d. a placard assembly, including a placard being in the shape of a hand and including a front end and a back end, said placard including a plurality of LEDs mounted thereon, wherein said plurality of LEDs are disposed on peripheral edges of said front end and said back end, wherein said peripheral edges define the shape of a hand, wherein said plurality of LEDs are disposed within a central area of said front end to form an indicia, wherein said indicia is the word "HELP!", wherein said placard includes a sidewall having a connecting rod protruding thereout, wherein said connecting rod is cylindrical in shape and has a length less than that of said third shaft, wherein said connecting rod is mounted to said third pivot point of said third shaft.

\* \* \* \* \*